United States Patent [19]
Zeller et al.

[11] Patent Number: 6,020,441
[45] Date of Patent: Feb. 1, 2000

[54] HYDROFORMYLATION OF ETHYLENICALLY UNSATURATED POLYMERS IN AQUEOUS DISPERSION

[75] Inventors: Edgar Zeller, Mannheim; Hartmann F. Leube; Bernhard Schlarb, both of Ludwigshafen; Heinz-Josef Kneuper, Mannheim; Michael Röper, Wachenheim, all of Germany

[73] Assignee: BASF Aktiengesellschaft, Ludwigshafen, Germany

[21] Appl. No.: 08/854,661

[22] Filed: May 12, 1997

[30] Foreign Application Priority Data

May 31, 1996 [DE] Germany ............. 196 22 061

[51] Int. Cl.$^7$ ............................................. C08E 8/00
[52] U.S. Cl. .................. 525/383; 524/571; 524/572; 524/573; 524/574; 524/575; 524/575.5; 525/332.8; 525/332.9; 525/333.1; 525/333.2; 525/370; 525/371
[58] Field of Search ................... 525/383, 370, 525/371

[56] References Cited

U.S. PATENT DOCUMENTS

| | | | |
|---|---|---|---|
| 4,334,042 | 6/1982 | Matsumoto et al. ............. | 525/383 |
| 4,960,834 | 10/1990 | Wideman ................. | 525/383 |
| 5,294,675 | 3/1994 | Firster et al. ............. | 525/383 |
| 5,369,187 | 11/1994 | Sommazzi et al. ............. | 525/383 |
| 5,442,015 | 8/1995 | Kennedy et al. ............. | 525/383 |
| 5,567,845 | 10/1996 | Franz et al. ............. | 525/383 |
| 5,674,950 | 10/1997 | Thaler et al. ............. | 525/383 |

FOREIGN PATENT DOCUMENTS

| | | |
|---|---|---|
| 0 522 655 | 1/1993 | European Pat. Off. . |
| 0 603 146 | 6/1994 | European Pat. Off. . |
| 40 21 370 | 1/1992 | Germany . |

OTHER PUBLICATIONS

F. Sibtain, et al., Journal of Polymer Science, No. 5, pp. 629–635, "Chemical Modification of Polymers: Catalytic Hydroformylation and Hydroxymethylation of Styrene-Butadiene Copolymers", Apr. 1991.

Primary Examiner—Bernard Lipman
Attorney, Agent, or Firm—Oblon, Spivak, McClelland, Maier & Neustadt, P.C.

[57] ABSTRACT

Polymers containing ethylenically unsaturated double bonds are hydroformylated by reacting aqueous dispersions of the polymers with hydrogen and carbon monoxide in the presence of suitable hydroformylation catalysts.

Also provided are the polymer dispersions obtainable by this process and the hydroformylated polymers themselves.

17 Claims, 2 Drawing Sheets

HYDROFORMYLATION OF ETHYLENICALLY UNSATURATED POLYMERS IN AQUEOUS DISPERSION

The present invention relates to a process for the hydroformylation of polymers containing ethylenically unsaturated double bonds.

The hydroformylation of polymers having ethylenically unsaturated double bonds is an important method of functionalizing such polymers which are generally prepared on an industrial scale but whose reaction products can often be prepared only with difficulty by direct polymerization of corresponding monomers. Such functionalized polymers in turn allow the use of new polymer-analogous reactions, for example new methods of crosslinking and the conversion into or the introduction of new functionalities which give the polymer new properties.

Processes for the hydroformylation of polymers having ethylenically unsaturated double bonds are known in principle. M. P. McGrath et al. describe the gradual hydroformylation and hydrogenation of EPDM polymers and polybutadienes using $HRhCO(PPh_3)_3$ or $Rh(CO)_2acac$ (acac = acetylacetonato) in toluene as hydroformylation catalyst (J. Appl. Polym. Sci. 56, (1995) 533–543). The hydroformylation is carried out in bulk or in toluene.

According to P. L. Mills et al., the hydroformylation of low molecular weight polybutadienes can be carried out successfully using Wilkinson's catalyst and an excess of triphenylphosphine in toluene (Ind. Eng. Chem. Res. 29, (1990) 1443–1454).

The process for carboxylating syndiotactic 1,2-polybutadiene having a particle size of less than 250 $\mu$m (U.S. Pat. No. 4,912,145) is also based on a hydroformylation in a first step. The polymers are reacted as a suspension in an organic medium.

F. Sibtain et al. (J. Polym. Sci. Part A, Polymer Chemistry, Vol. 29, (1991) 629–635) describe the hydroformylation of various styrene-butadiene block copolymers using $HRh(CO)(PPh_3)_3$ in toluene as hydroformylation catalyst.

The hydroformylation of polymers such as 1,4-polybutadiene, styrene-butadiene copolymers and ethyl acrylate-butadiene copolymers by means of cobalt catalysts is described by Floyd L. Ramp et al., (J. Polym. Sci. Part A-1, 4 (1966) 2267). In this reaction, gel formation resulting from aldol condensation is observed and the hydroformylated polymers are thus insoluble.

Overviews of the hydroformylation of polymers having olefinically unsaturated double bonds, for example polyisoprene or styrene-butadiene copolymers, are given by N. T. McManus et al. (J. Macromol. Sci., Rev. Macromol. Chem. Phys. C35(2) (1995) 239–285) and U.S. Pat. No. 4,914,157. However, all the processes described have in common the fact that the reaction is carried out in an organic medium, either as a homogeneous reaction of the dissolved polymer or as a heterogeneous reaction of the suspended polymer, or in bulk.

A transfer of the hydroformylation of polymers to aqueous systems appears to be desirable from various points of view. Thus, on the one hand, aqueous polymer dispersions can often be prepared directly by emulsion polymerization. On the other hand, the use of solvents in the production is a not insignificant cost factor and its avoidance appears desirable for reasons of occupational hygiene and environmental protection.

However, the hydroformylation of polymers in aqueous dispersion has hitherto been considered impossible. A reason for this has been the view that, for a successful hydroformylation, polymers have to be present in a dissolved or molten, but at least swollen, state in order to make the reaction with carbon monoxide and hydrogen possible. This is the case for hydroformylation in solution or suspension in an organic medium, but not in an aqueous polymer dispersion, and the hydroformylation of hydrophobic polymers has therefore, as mentioned above, hitherto always been carried out in an organic medium or in bulk.

This opinion is confirmed, for example, by B. Cornils in Angew. Chem. 1995, 107, 1709–1711. It is stated that, in a two-phase catalysis, the use of water as second phase reaches its limits when the starting materials, here the polymers, are insufficiently soluble in water and the transfer of organic substrate into the aqueous phase or at the interfaces is thus hindered and the reaction rate becomes unsatisfactory. In the case of the two-phase hydroformylation of olefins, this limit appears to be reached for dodecene.

It is an object of the present invention to find a process for the hydroformylation of aqueous polymer dispersions.

We have found that this object is achieved if the hydroformylation conditions are chosen so that the catalyst penetrates at least partially into the polymer/water interface or crosses this interface.

BRIEF DESCRIPTION OF THE DRAWINGS

The Figures are IR-spectroscopic analyses of several of the examples specifically showing the consumption of the C=C groups during hydroformylation.

The present invention accordingly provides a process for the hydroformylation of polymers containing ethylenically unsaturated double bonds by reacting the polymers with carbon monoxide and hydrogen in the presence of a hydroformylation catalyst, wherein the reaction is carried out in an aqueous dispersion of the polymers under such conditions that the catalyst penetrates at least partially into the polymer phase or at least into the polymer/water phase boundary. This can be achieved by selection of the catalyst and the hydroformylation conditions (pressure and temperature). According to Beller et al (J. Mol. Catal. A 104 (1995) 20 ff.), catalytically active species of the general formula $H_xM_y(CO)_zL_q$, where M is the respective catalyst metal, L are modifying ligands which may be present and q, x, y, z are integers dependent on the valence and type of the metal and also the binding strength of the ligands L, are produced under hydroformylation conditions from the catalysts or catalyst precursors used in each case. These species are able to penetrate at least partially into the polymer phase or into the water/polymer phase boundary region. This is the case, for example, in rhodium catalysts which are generally converted into "bare rhodium" $[RhH(CO)_4]$. Correspondingly, cobalt catalysts are converted into $[HCo(CO)_4]$ (see Beller et al.).

Figure 1:
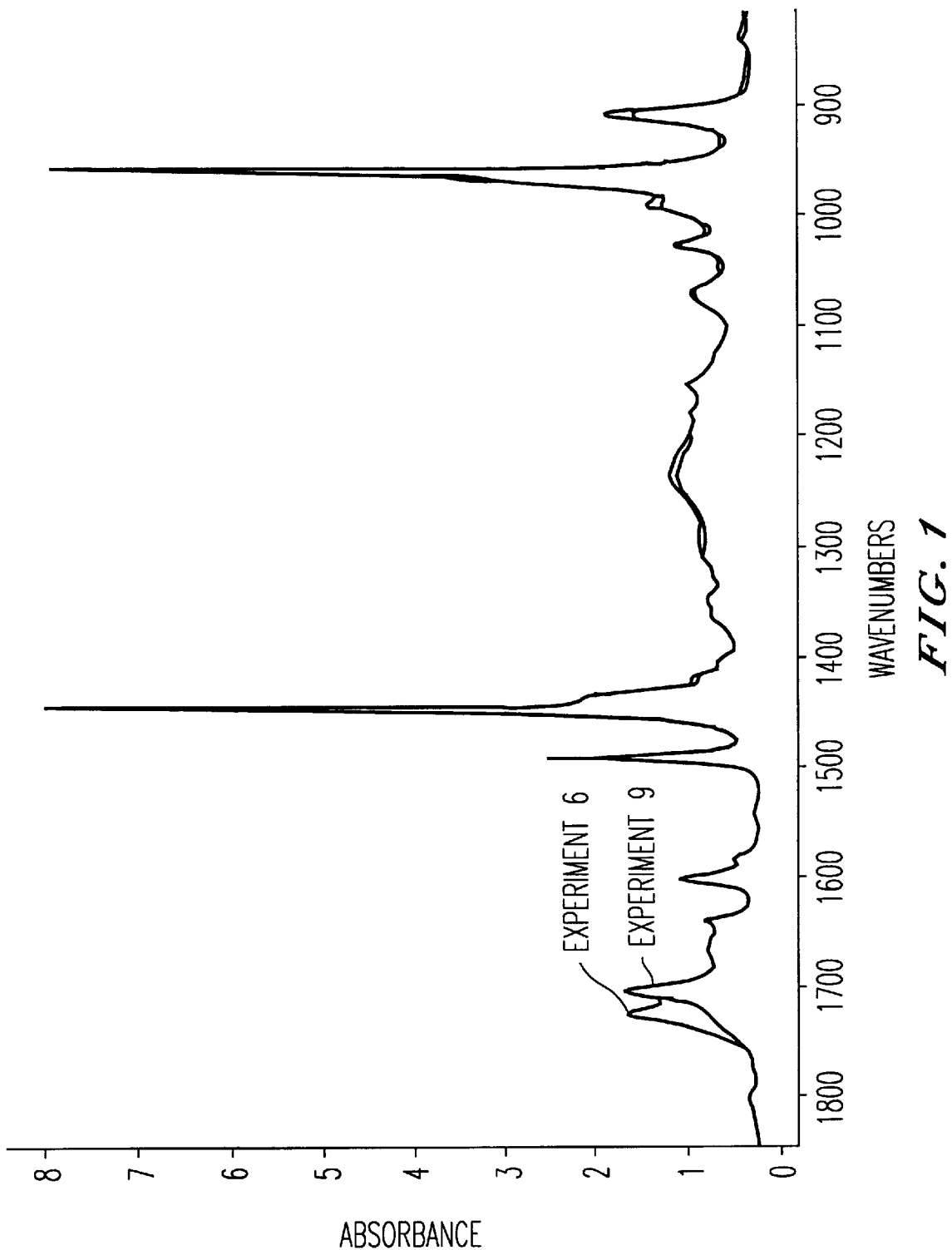

Alternatively, the ligands of the catalyst can be selected such that the latter assumes a lipophilic character and is therefore able to go over into the polymer phase.

For the process of the present invention, suitable catalysts are in principle all those which do not bind the active species in the aqueous phase under the reaction conditions. Suitable catalysts or catalyst precursors are generally salts or complexes of cobalt, rhodium, ruthenium, osmium, iridium, palladium or platinum, the latter possibly in combination with tin salts. Preference is given to salts or complexes of cobalt, rhodium or ruthenium, in particular rhodium. Suitable salts are, for example, the hydrides, halides, nitrates, sulfates, oxides, sulfides or the salts of alkylcarboxylic or arylcarboxylic acids or alkylsulfonic or arylsulfonic acids. Suitable complexes are, for example, the carbonyl compounds of the metals mentioned and also complexes containing amine, triarylphosphine, trialkylphosphine, olefin or dienes as ligands. Also known are catalyst systems which are prepared in situ from the abovementioned salts an d the ligands mentioned.

Here and in the following, alkyl is preferably linear or branched $C_1-C_{12}$-alkyl, in particular $C_1-C_6$-alkyl, eg. ethyl, n-propyl, i-propyl, n-butyl, 2-butyl, i-butyl, tert.-butyl, pentyl, n-hexyl, 2-ethylhexyl. Cycloalkyl is pref erably $C_3-C_{10}$-cycloalkyl, in particular cyclopentyl and cyclohexyl, each of which may also be substituted by $C_1-C_4$-alkyl groups. Aryl is preferably phenyl (Ph) or naphthyl, and may be substituted by 1, 2, 3 or 4 $C_1-C_4$-alkyl groups, preferably methyl, ethyl, i-propyl or t-butyl, $C_1-C_4$-alkoxy, eg. methoxy, halogen, preferably chloride, or hydroxy which may also be ethoxylated.

Suitable rhodium catalysts or catalyst precursors are rhodium(II) and rhodium(III) salts such as rhodium(III) chloride, rhodium(III) nitrate, rhodium(III) sulfate, potassium rhodium sulfate (rhodium alum), rhodium(II) or rhodium(III) carboxylate, preferably rhodium(II) and rhodium(III) acetate, rhodium(III) oxide, salts of rhodic(III) acid, triammonium hexachlororhodate (III).

Also suitable are rhodium complexes of the general formula $RhX_mL^1L^2(L^3)$, where X is halide, preferably chloride or bromide, alkylcarboxylate or arylcarboxylate, acetylacetonate, arylsulfonate or alkylsulfonate, in particular phenylsulfonate and toluenesulfonate, hydride or the diphenyltriazine anion, m is 1 or 3, n is 0, 1 or 2, $L^1$, $L^2$ and $L^3$ are, independently of one another, CO, olefins, cycloolefins, preferably cyclooctadiene (COD), dibenzophosphole, benzonitrile, $PR_3$ or $R_2P$-$A$-$PR_2$. In the phosphine ligands, the radicals R (which may be identical or different) are alkyl, cycloalkyl or aryl radicals, preferably phenyl, p-tolyl, m-tolyl, p-ethylphenyl, p-cumyl, p-tert.-butyl-phenyl, P-$C_1-C_4$-alkoxyphenyl, preferably p-anisyl, xylyl, mesityl, p-hydroxyphenyl which may also be ethoxylated, isopropyl, $C_1-C_4$-alkoxy, cyclopentyl or cyclohexyl. A is 1,2-ethylene or 1,3-propylene. $L^1$, $L^2$ and $L^3$ are preferably, independently of one another, CO, COD, P(phenyl)$_3$, P(i-propyl)$_3$, P(anisyl)3, P(OC$_2$H$_5$)$_3$, P(cyclohexyl)$_3$, dibenzophosphole or benzonitrile. X is preferably hydride, chloride, bromide, acetate, tosylate, acetylacetonate or the diphenyltriazine anion, in particular hydride, chloride or acetate. Particularly preferred rhodium complexes are, for example, RhCl(PPh$_3$)$_3$, RhCl(CO)(PPh$_3$)$_2$, RHH(CO)(PPh$_3$)$_3$ and RhH(PPh$_3$)$_4$. Rhodium carbonyl compounds such as dodecacarbonyltetrarhodium or hexadecacarbonylhexarhodium can also be used for the process of the present invention.

Ruthenium salts or compounds are likewise suitable for the process of the present invention. Suitable ruthenium salts are, for example, ruthenium(III) chloride, ruthenium(IV), ruthenium(VI) or ruthenium(VIII) oxide, alkali metal salts of ruthenium-oxygen acids such as K$_2$RuO$_4$ or KRuO$_4$ or complexes of the general formula $RuX^1X^2L^1L^2(L^3)_n$, where $L^1$, $L^2$, $L^3$ and n are as defined above and $X^1$, $X^2$ are as defined for X above, eg. RuHCl(CO)(PPh$_3$)$_3$. The metal carbonyls of ruthenium such as dodecacarbonyltrisruthenium or octadecacarbonylhexaruthenium, or mixed forms in which CO is partially replaced by ligands of the formula PR$_3$, for example Ru(CO)$_3$(PPh$_3$)$_2$, can also be used in the process of the present invention.

Suitable cobalt compounds are, for example, cobalt(II) chloride, cobalt(II) sulfate, cobalt(II) nitrate, their amine or hydrate complexes, cobalt carboxylates such as cobalt acetate, cobalt ethylhexanoate, cobalt naphthanoate and also the cobalt-caprolactamate complex. Here too, it is possible to use the carbonyl complexes of cobalt such as octacarbonyldicobalt, dodecacarbonyltetracobalt and hexadecacarbonylhexacobalt.

The above compounds of cobalt, rhodium and ruthenium are known in principle and are sufficiently well described in the literature or can be prepared by a person skilled in the art using methods similar to those for the known compounds.

Suitable palladium compounds are, for example, the compounds listed in Table 8 in the article by McManus (p. 260, see above) and also palladium hydride, palladium chloride, palladium iodide, palladium nitrate, palladium cyanide, palladium acetate, palladium sulfate or palladium oxide. Suitable platinum compounds are, for example, platinum(IV) compounds such as the alkali metal or ammonium salts of hexachloroplatinic acid, platinum(IV) oxide or salts of platinic(IV) acid. Also suitable are platinum(II) iodide and the complexes obtained therefrom by reaction with olefins, for example the alkali metal salts of trichloromonoethyleneplatinum. If platinum catalysts are used, the presence of a tin(II) salt such as tin(II)chloride is advisable.

Possible substrates for the hydroformylation process of the present invention are in principle all those polymers having ethylenically unsaturated double bonds which are prepared in aqueous dispersion (primary dispersions) and those which can be converted into an aqueous dispersion (secondary dispersions).

Suitable polymers containing ethylenically unsaturated double bonds are, for example, homopolymers or copolymers of conjugated dienes containing, in copolymerized form, preferably from 10 to 100% by weight, in particular from 20 to 80% by weight, of at least one conjugated diene A and from 0 to 90% by weight, in particular from 20 to 80% by weight, of monoethylenically unsaturated monomers or monomer mixtures B which are copolymerizable therewith. Here, the monomer mixture B may contain a small amount, preferably up to 10% by weight, in particular up to 5% by weight and specifically from 0.2 to 3% by weight of the total weight of monomers A and B, of monomers B' whose homopolymers are soluble in water. The diene component A is preferably butadiene, isoprene, chloroprene, 1-methylbutadiene, 2,3-dimethylbutadiene, 2-(tri-$C_1-C_4$-alkoxysilyl)butadiene or mixtures thereof. Suitable monomers B are olefins such as ethylene, propylene, n-butene, preferably isobutene, vinylaromatic monomers such as styrene, a-methylstyrene, o-chlorostyrene or vinyltoluenes, $C_1-C_{12}$-alkyl vinyl ethers such as methyl, ethyl, n-propyl, i-propyl, n-butyl, i-butyl or 2-ethylhexyl vinyl ether, vinyl esters of $C_1-C_{18}$-monocarboxylic acids, for example vinyl acetate, vinyl propionate, vinyl butyrate, vinyl valerate, vinyl hexanoate, vinyl-2-ethyl-hexanoate, vinyl decanoate, vinyl laurate and vinyl stearate. Also suitable are esters of α,β-ethylenically unsaturated $C_3-C_{10}$-monocarboxylic or dicarboxylic acids with $C_1-C_{12}$-, preferably $C_1-C_8$- and in particular $C_1-C_4$-alkanols. Esters of these acids with $C_5-C_8$-cycloalkanols can also be used. Suitable alkanols are, for example, methanol, ethanol, n-propanol, iso-propanol, 1-butanol, 2-butanol, iso-butanol, t-butanol, n-hexanol, 2-ethylhexanol, cyclopentanol and cyclohexanol. Preferred esters are those of acrylic acid, methacrylic acid, maleic acid, fumaric acid and itaconic acid. Specific examples are methyl (meth)acrylate, ethyl (meth)acrylate, n-butyl (meth) acrylate, iso-butyl (meth)acrylate and 2-ethylhexyl (meth) acrylate, dimethyl maleate or di-n-butyl maleate. Other possibilities are nitriles of α,β-monoethylenically unsaturated carboxylic acids, for example acrylonitrile or methacrylonitrile. The monomers B' present in a subordinate amount are, for example, α,β-unsaturated $C_3$–$C_{10}$-monocarboxylic or dicarboxylic acids or their amides, preferably acrylic acid, methacrylic acid, maleic acid, fumaric acid, itaconic acid, acrylamide or methacrylamide, and also N-vinyllactams, eg. N-vinylpyrrolidone. Also suitable as monomers B' are the salts of ethylenically unsaturated alkylsulfonic or arylsulfonic acids such as vinylsulfonic acid, methallylsulfonic acid, vinylbenzenesulfonic acid, acrylamidosulfonic acid, etc.

Particularly suitable monomer combinations for polymer dispersions are, for example, butadiene with styrene; butadiene with acrylonitrile and/or methacrylonitrile; butadiene and isoprene with acrylonitrile and/or methacrylonitrile; butadiene with isobutene; butadiene with (meth)acrylic esters; where all monomer combinations mentioned can contain small amounts of the monomers B', preferably (meth)acrylic acid and/or their amides.

The preparation of such polymers is known to a person skilled in the art and can be carried out by anionic, cationic, free-radical or Ziegler-Natta polymerization in solution, in bulk, in suspension or in emulsion. In these polymers, the conjugated dienes are present in 1,4-polymerized or 1,2-polymerized form, depending on the reaction type selected.

For the process of the present invention, preference is given to polymers which have been prepared by free-radical emulsion polymerization (including mini emulsion and micro emulsion polymerization). These methods are sufficiently well known to a person skilled in the art and are comprehensively described in the literature, for example in Ullmanns Encyclopedia of Industrial Chemistry, 5th ed., Vol. A21, pp. 373–393. In general, such polymerizations are carried out in the presence of free-radical initiators, for example peroxo compounds, azo compounds or redox systems, surface-active substances such as surfactants and protective colloids (see, for example, Houben-Weyl, Methoden der organischen Chemie, Vol. XIV/1, Makromolekulare Stoffe, Georg-Thieme-Verlag, Stuttgart, 1961, pp. 192–208). To regulate the molecular weight of the polymers obtained, compounds which regulate the molecular weight, for example organic thio compounds such as dodecyl mercaptan, can be added to the medium.

Another class of polymers which are suitable for reaction in the process of the present invention are copolymers comprising as main constituent monoethylenically unsaturated monomers B and as secondary constituent non-conjugated dienes or polyenes C in copolymerized form. What has been said above in respect of the monoethylenically unsaturated monomers B also applies here. Possible non-conjugated dienes or polyenes C are, in particular, those dienes or polyenes whose double bonds have different reactivities. Suitable monomers C are, for example, vinyl esters of α,β-unsaturated monocarboxylic or dicarboxylic acids, eg. vinyl (meth)acrylate, diolefins such as dicyclopentadiene, vinylnorbornene and 1,6-hexadiene. Terpolymers of the latter monomers with ethylene or propylene are known and commercially available under the generic name EPDM rubbers.

A further suitable class of polymers having ethylenically unsaturated double bonds are unsaturated polyesters. These are obtainable by copolycondensation of diols and dicarboxylic acids, with part of the dicarboxylic acid components consisting of unsaturated dicarboxylic acids (cf. Römpp Chemie-Lexikon, 9th edition, "Ungesättigte Polyester"). Polycondensates, comprising cocondensed maleic anhydride or fumaric acid are commercially available, for example under the name Norsodyne® (CdF-Chimie, Paris).

A further suitable class of polymers having ethylenically unsaturated double bonds are the propylene oxide rubbers which are prepared by copolymerization of propylene oxide with subordinate amounts of unsaturated oxiranes, for example glycidyl allyl ether. A product comprising 40 parts of propylene oxide and 1 part of glycidyl allyl ether is commercially available under the name Parel 58® (Goodridge). Similar polymers containing ethylene oxide are also known.

A further class of suitable ethylenically unsaturated polymers are the polycycloalkenamers obtainable by a metathesis reaction of cycloalkenes and possibly copolymers (see Houben-Weyl, E20/2, 918–927). Monomers used are, for example, cyclobutene, cyclopentene, cyclooctene, norbornene and dicyclopentadiene. Polycyclopentenamers are commercially available, for example under the trade names Vestenamer® (Hüls AG, Marl) or Norsorex® (CdF-Chimie, Paris).

All classes of polymer mentioned can be obtained directly by polymerization or polycondensation. However, it is also possible to chemically modify the polymers mentioned before they are used in the hydroformylation reaction of the present invention. Furthermore, the ethylenically unsaturated double bonds can be introduced by polymer-analogous reactions, for example by elimination or by etherification or esterification of OH groups or carboxyl groups in the polymer using allyl halides, allyl alcohols or acid halides of α,β-unsaturated carboxylic acids.

In the polymer dispersions to be used according to the present invention, the mean diameter of the polymer particles is generally in the range from 10 nm to 100 μm, preferably from 10 nm to 1 μm. The term "polymer dispersion" also includes micro-capsules. The solids content of the polymer dispersions is in principle not restricted, but is generally not more than 75% by weight. Of particular importance are polymer dispersions having a solids content in the range from 40 to 70% by weight. The polymer dispersions generally additionally contain surface-active substances and also further materials which, for example, are used in emulsion polymerizations as customary polymerization aids (see above). Even though these materials generally do not interfere in the process of the present invention, it is advisable to deodorize the polymer dispersions beforehand by chemical or physical means.

The hydroformylation is generally carried out by adding a catalyst or a catalyst precursor plus, if desired, one of the ligands mentioned under $L^1$, $L^2$ or $L^3$ to the polymer dispersion which has, if necessary, been adjusted to a suitable solids content, subsequently setting the desired hydrogen and carbon monoxide pressure and heating to a suitable reaction temperature. The reaction is generally carried out at a partial pressure of the reaction gas in the range from atmospheric pressure to 600 bar, preferably from 20 to 300 bar, depending on the catalyst used in each case and on the reactivity of the double bond present in the polymers, and at from 20° C. to 200° C., preferably from 50° C. to 150° C. In the case of ligand-modified catalyst systems, the pressure is generally lower, preferably in the range from 1 to 100 bar, in the case of bare rhodium from about 50 to 600 bar.

The molar ratio of carbon monoxide to hydrogen in the reaction gas is generally from 1:5 to 5:1, preferably from 4:6 to 6:4. The reaction can be continued to the desired conversion, depending on the desired properties of the hydroformylated polymer. The conversion can be determined, for example, by means of the carbonyl number in accordance with DIN 53173.

The polymer dispersions obtainable by the process of the present invention as well as the polymers themselves are further subject matter of the present invention. In the polymers, the double bonds are hydroformylated uniformly over the entire polymer particle.

Depending on the desired application, the polymer dispersions are used directly or the polymer is isolated. It is also possible to carry out a subsequent reaction to modify the newly obtained aldehyde functions in the polymer dispersion. For example, the aldehyde function can be hydrogenated to the alcohol function by use of hydrogen in the presence of a suitable catalyst, for example one of the hydroformylation catalysts mentioned, and hydrogen, at atmospheric or superatmospheric pressure. It can also be oxidized to a carboxylic acid function. Furthermore, the aldehyde functions can be converted into acetals in the presence of alcohols, converted into imines, reductively aminated or converted into nitrile groups by reaction with hydroxylamine and subsequent dehydration. In this way, on the one hand, new reaction centers having new reactivities are created and, on the other hand, it is possible to crosslink the aldehyde function in a type of vulcanization by use of polyols.

The examples below illustrate the invention but do not restrict it.

EXAMPLES

Preparation of butadiene-containing polymer dispersions

Example 1

The polymerization was carried out by the semicontinuous free-radical emulsion polymerization method in a pressure vessel having jacket cooling and fitted with a stirrer.

| Initial charge: | 0.75 g of EDTA |
| --- | --- |
| | 375 g of sodium persulfate |
| | 380 g of feedstream 1 |
| | 22.1 kg of deionized water |
| Feedstream 1: | 2325 g of butadiene |
| | 4875 g of styrene |
| | 150 g of methacrylic acid |
| | 150 g of acrylic acid |
| | 112 g of tert-dodecyl mercaptan |
| Feedstream 2: | 18.75 g of sodium persulfate |
| | 22.5 g of sodium pyrophosphate |
| | 1250 g of deionized water |

The initial charge was heated to 82° C. while stirring. After reaching this temperature, the measured addition of the feedstreams was commenced while continuing to stir. Feedstream 1 was metered in in 2.5 hours, feedstream 2 in 3.0 hours. After the metered addition of feedstream 2 was complete, the polymerization was continued for 2 hours at 82° C. while continuing to stir. The mixture was subsequently cooled and depressurized. The pH was subsequently adjusted to 6.5 using 25% strength aqueous ammonia solution. This gave a stable, aqueous polymer dispersion having a solids content of 32.8%. The pH was 6.5. The mean size of the polymer particles was 198 nm. The polybutadiene content of the dispersion was 28.9%, based on solids.

Example 2

The polymerization was carried out by the semicontinuous free-radical emulsion polymerization method in a pressure vessel having jacket cooling fitted with a stirrer.

| Initial charge: | 1.7 kg of polystyrene seed dispersion (solids content 35%, particle size: 38 nm, stabilized with 10% of sodium dodecylbenzenesulfonate) |
| --- | --- |
| | 5% of feedstream 1 |
| | 5% of feedstream 2 |
| | 17.0 kg of deionized water |
| Feedstream 1: | 25.7 kg of butadiene |
| | 22.25 kg of styrene |
| | 1.5 kg of acrylic acid |
| | 0.5 kg of acrylamide |
| | 0.45 kg of tert-dodecyl mercaptan |
| | 1.1 kg of emulsifier Texapon ® NSO (commercial product of Henkel) |
| | 0.6 kg of tetrasodium pyrophosphate |
| | 17.26 kg of deionized water |
| Feedstream 2: | 0.5 kg of sodium persulfate |
| | 7.0 kg of water |

The initial charge was heated while stirring to 82° C. over a period of 15 minutes and polymerized for 30 minutes. Subsequently, at 82° C. while stirring, the remaining feedstream 1 was added over a period of 5.5 hours and, starting simultaneously with feedstream 1, the remaining feedstream 2 was added over a period of 6.0 hours. Subsequently, polymerization was continued at 85° C. for 2.5 hours. After cooling and depressurizing the dispersion, the pH was adjusted to 5.4 using 25% strength aqueous ammonia solution. This gave a stable aqueous dispersion having a solids content of 48.3%. The particle size was 163 nm. The polybutadiene content calculated from the amount of butadiene used was 50.0%, based on solids.

Example 3

The polymerization was carried out by the semicontinuous free-radical emulsion polymerization method in a pressure vessel having jacket cooling fitted with a stirrer.

| Initial charge: | 2.8 kg of polystyrene seed dispersion (solids content 35%, particle size: 38 nm, stabilized with 10% of sodium dodecylbenzenesulfonate) |
| --- | --- |
| | 5% of feedstream 1 |
| | 10% of feedstream 2 |
| | 17.0 kg of deionized water |
| Feedstream 1: | 42.5 kg of butadiene |
| | 5.0 kg of styrene |
| | 1.75 kg of acrylic acid |
| | 1.5 kg of acrylamide |
| | 0.3 kg of tert-dodecyl mercaptan |
| | 1.1 kg of emulsifier Texapon ® NSO |
| | 0.15 kg of tetrasodium pyrophosphate |
| | 17.26 kg of deionized water |
| Feedstream 2: | 0.4 kg of sodium persulfate |
| | 7.0 kg of water |

The initial charge was heated while stirring to 75° C. over a period of 15 minutes and polymerized for 30 minutes. Subsequently, at 75° C. while stirring, the remaining feedstream 1 was added over a period of 7.0 hours and, commencing simultaneously with feedstream 1, the remaining feedstream 2 was added over a period of 7.5 hours. Subsequently, polymerization was continued at 75° C. for 2.5 hours. After cooling and depressurizing the dispersion, the pH was adjusted to 6.3 using 25% strength aqueous ammonia solution. This gave a stable aqueous dispersion having a solids content of 48.6%. The particle size was 148 nm. The polybutadiene content calculated from the amount of butadiene used was 85%, based on solids.

Example 4

The polymerization was carried out by the semicontinuous free-radical emulsion polymerization method in a steel reactor fitted with a stirrer.

| Initial charge: | 0.23 kg of polystyrene seed dispersion (solids content 29%, particle size: 28 nm, stabilized with 10% of sodium dodecylbenzenesulfonate) |
| --- | --- |
| | 26.8 g of Texapon ® NSO |
| | 1.8 kg of aqueous itaconic acid solution (5% strength by weight) |
| | 2% of feedstream 1 |
| | 20% of feedstream 2 |
| | 5 kg of deionized water |
| Feedstream 1: | 6.3 kg of butadiene |
| | 8.0 kg of styrene |
| | 0.5 kg of acrylic acid |
| | 225 g of acrylamide |
| | 294 g Texapon ® NSO |
| | 1.1 g of emulsifier Texapon ® NSO |
| | 120 g of 25% strength aqueous NaOH-solution |
| | 5.0 kg of deionized water |
| Feedstream 2: | 0.15 kg of sodium persulfate |
| | 3.0 kg of water |

The initial charge was heated over a period of 15 minutes. Subsequently, while stirring, feedstream 1 and feedstream 2 were added, commencing simultaneously, over a period of 3.5 hours and polymerization was continued for 2 hours while maintaining the temperature. Cooling gave a stable dispersion having a solids content of 52.1%. The particle size was 181 nm.

Examples of the hydroformylation of selected polymer dispersions

Example 5

Hydroformylation of styrene-butadiene copolymer dispersions from Examples 1 to 4 in water (Experiments 1 to 15) 100 ml of the aqueous styrene-butadiene copolymer dispersion (see Table 1) was degassed in a Schlenk tube by passing in argon while stirring. In a further Schlenk tube, the amount of rhodium(II) acetate required in each case (see Table 1) was dissolved in 5 ml of distilled water and was likewise degassed by passing in argon. This solution was intensively premixed with the dispersion and introduced into a nitrogen-filled 300 ml autoclave fitted with a stirrer. The autoclave was heated to 100° C. while increasing the pressure to 280 bar by introduction of a mixture of carbon monoxide and hydrogen (molar ratio 1:1). The pressure in the autoclave dropped during the reaction as a result of part of the gas mixture reacting and was maintained for the desired residence time by further introduction of the hydrogen/carbon monoxide mixture. After the desired reaction time, the heating and gas feed were turned off and the cooled autoclave was discharged via a riser pipe into an argon-filled Schlenk tube. The product continues to form a polymer dispersion. The results are summarized in Table 1.

TABLE 1

The hydroformylation conditions are indicated in the Table. The success of the hydroformylation was checked by IR spectroscopy and the determination of the carbonyl number (in accordance with DIN 53173).

| Experiment | Disp. from Example | Rh/Dispersion [mg/kg]+ | Residence time (h) | Pressure (bar) | Temp. (° C.) | IR band at 1726 cm$^{-1}$ | CO number* |
| --- | --- | --- | --- | --- | --- | --- | --- |
| 1 | 1 | 250 | 5 | 280 | 100 | strong | 11 |
| 2 | 1 | 50 | 5 | 280 | 100 | medium | 6 |
| 3 | 1 | 50 | 1 | 280 | 100 | medium | 4 |
| 4 | 1 | 0 | | Blank | | none | <1 |
| 5 | 2 | 250 | 5 | 280 | 100 | strong | 25 |
| 6 | 2 | 50 | 5 | 280 | 100 | medium | 10 |
| 7 | 2 | 50 | 1 | 280 | 100 | medium | 9 |
| 8 | 2 | 5 | 1 | 280 | 100 | weak | 1 |
| 9 | 2 | 0 | | Blank | | none | <1 |
| 10 | 3 | 50 | 5 | 280 | 100 | medium | 12 |
| 11 | 3 | 25 | 5 | 280 | 100 | medium | 10 |
| 12 | 3 | 5 | 5 | 280 | 100 | weak | 2 |
| 13 | 3 | 0 | | Blank | | none | <1 |
| 14 | 4 | 50 | 5 | 280 | 100 | strong | 51 |
| 15 | 4 | 0 | | Blank | | none | <1 |

+based on the dispersion
*CO number: Carbonyl number [mg of KOH/g of dispersion]

Analysis

Particle size of the polymer

The particle size (number average) of the polymer particles was determined by dynamic light scattering on a 0.01% strength by weight dispersion at 23° C. by means of an Autosizer IIc from Malvern Instruments, England. The figure given is the mean diameter of the cumulative distribution (cumulative number average) of the measured autocorrelation function.

IR Spectroscopy

For the IR-spectroscopic analysis, the dispersions obtained in Experiments 1 to 15 were diluted with water and applied onto a ZnS window. The windows were subsequently dried at 40° C. The spectra were recorded using a Biorad FTS-7 spectrometer connected to an SPC-3200 processor.

Figure 2:
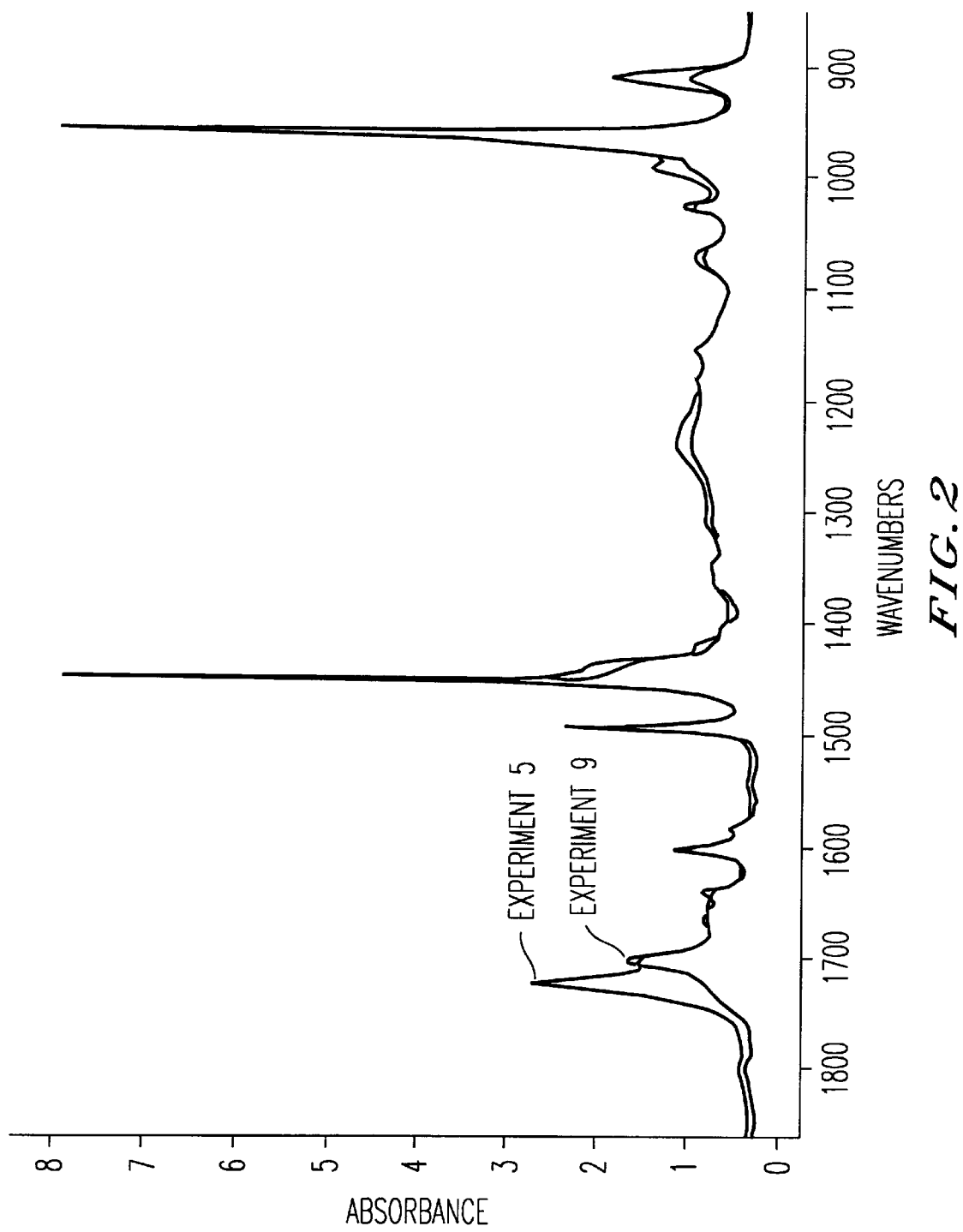

The band measured was that of the C=O stretching vibration at 1726 cm$^{-1}$, which is typical of aldehyde groups. Correspondingly, it was observed that the signal at 910 cm$^{-1}$ which is attributable to 1,2-polybutadiene decreased with increasing conversion (consumption of the C=C groups in the hydroformylation) (see FIG. 1 and 2). 135/hz

We claim:

1. A process for the hydroformylation of polymers containing ethylenically unsaturated double bonds by reacting the polymers with carbon monoxide and hydrogen in the presence of a hydroformylation catalyst, wherein the reaction is carried out in an aqueous dispersion of the polymers under such conditions that the catalyst penetrates at least partially into the polymer phase or at least into the polymer/water phase boundary.

2. A process as claimed in claim 1, wherein the catalyst used comprises salts or complexes of cobalt, rhodium, ruthenium, osmium, iridium, palladium or platinum.

3. A process as claimed in claim 1, wherein the catalyst used is a salt or a complex of rhodium.

4. A process as claimed in claim 1, wherein the polymer dispersions comprise homopolymers or copolymers of conjugated dienes which are made up of from 10 to 100% by weight of at least one conjugated diene A and from 0 to 90% by weight of at least one monoethylenically unsaturated monomer B which is copolymerizable with the diene A.

5. A process as claimed in claim 1, wherein the polymer dispersions comprise copolymers comprising as main constituent monoethylenically unsaturated monomers B and as secondary constituent non-conjugated dienes or polyenes C in copolymerized form.

6. A process as claimed in claim 1, wherein the reaction is carried out at from room temperature to 200° C. and a partial pressure of the reaction gas (hydrogen+carbon monoxide) in the range from 1 to 600 bar.

7. A process as claimed in claim 6, wherein the temperatures are selected in the range from 50 to 150° C. and the pressure is selected in the range from 20 to 300 bar.

8. A process as claimed in claim 1, wherein the molar ratio of $H_2$:CO is in the range from 1:5 to 5:1.

9. A process as claimed in claim 2, wherein the catalyst used is a salt or a complex of rhodium.

10. A process as claimed in claim 9, wherein the catalyst is selected from the group consisting of rhodium carboxylate, rhodium oxide, a salt of rhodic acid and an ammonium halogen complex of rhodium.

11. A process as claimed in claim 3, wherein the catalyst is selected from the group consisting of rhodium carboxylate, rhodium oxide, a salt of rhodic acid and an ammonium halogen complex of rhodium.

12. A process as claimed in claim 2, wherein the polymer dispersions comprise homopolymers or copolymers of conjugated dienes which are made up of from 10 to 100% by weight of at least one conjugated diene A and from 1 to 90% by weight of at least one monoethylenically unsaturated monomer B which is copolymerizable with the diene A.

13. A process as claimed in claim 3, wherein the polymer dispersions comprise homopolymers or copolymers of conjugated dienes which are made up of from 10 to 100% by weight of at least one conjugated diene A and from 1 to 90% by weight of at least one monoethylenically unsaturated monomer B which is copolymerizable with the diene A.

14. A process as claimed in claim 2, wherein the polymer dispersions comprise copolymers comprising as a main constituent monoethylenically unsaturated monomers B and as a secondary constituent non-conjugated dienes or polyenes C in copolymerized form.

15. A process as claimed in claim 3, wherein the polymer dispersions comprise copolymers comprising as a main constituent monoethylenically unsaturated monomers B and as a secondary constituent non-conjugated dienes or polyenes C in copolymerized form.

16. A process as claimed in claim 2, wherein the reaction is carried out at from room temperature to 200° C. and a partial pressure of the reaction gas (hydrogen+carbon monoxide) in the range from 1 to 600 bar.

17. A process as claimed in claim 2, wherein the molar ratio of $H_2$:CO is in the range from 1:5 to 5:1.

* * * * *